United States Patent Office 3,553,572
Patented Jan. 5, 1971

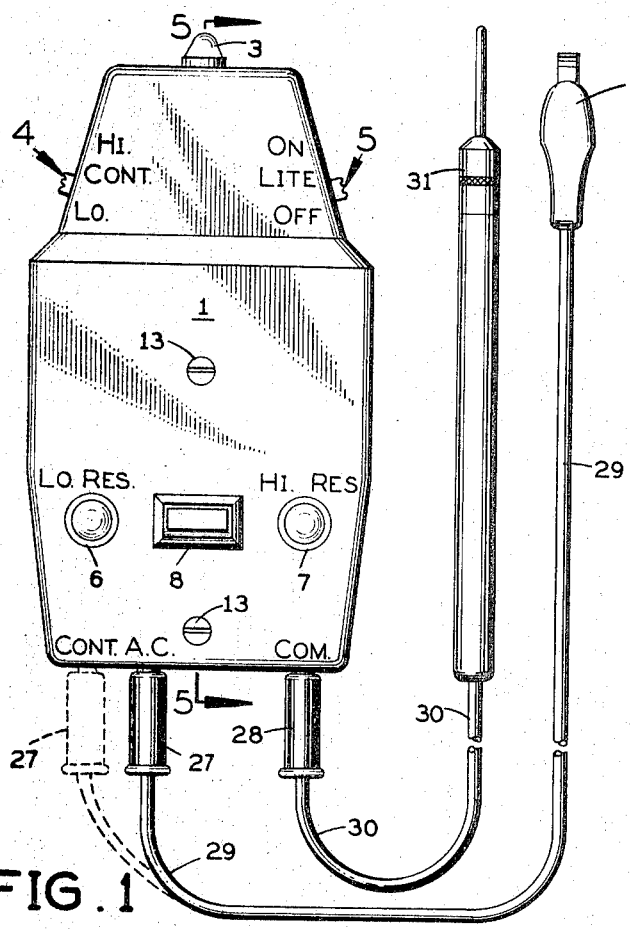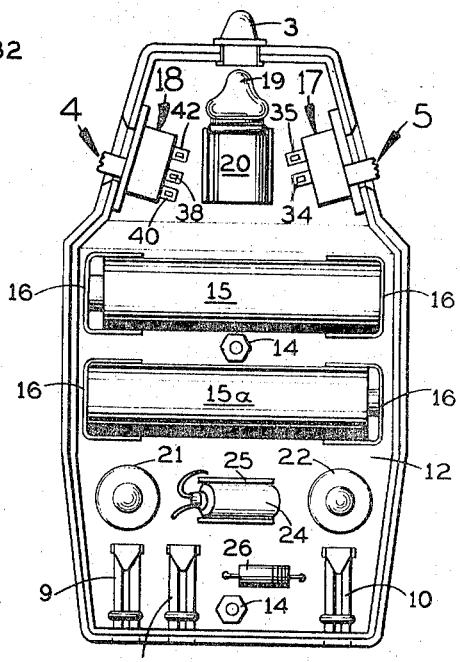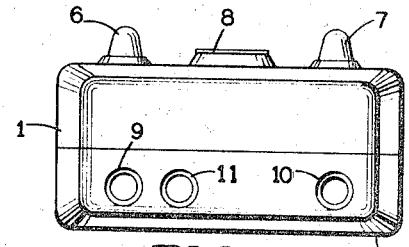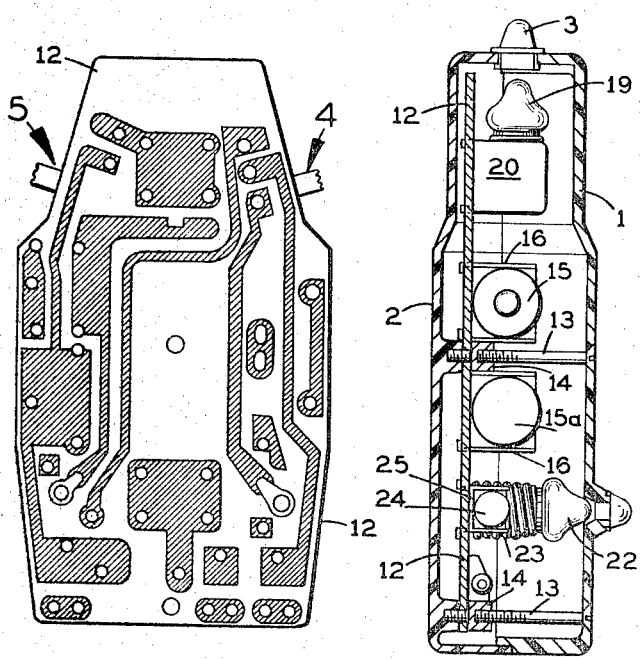

3,553,572
PORTABLE ELECTRIC CIRCUIT TESTER HAVING A PAIR OF RESISTANCE INDICATING LAMPS
James R. Harmon, Miami, Fla., assignor to Lumidor Products Corp., Hialeah, Fla., a corporation of Florida
Filed July 25, 1968, Ser. No. 747,577
Int. Cl. G01r 31/02
U.S. Cl. 324—53
1 Claim

ABSTRACT OF THE DISCLOSURE

A portable electric tester energized by a pair of self-contained batteries including switch means and a pair of electric lamps for determining four approximate ranges of external circuit resistance dependent upon the visual interpretation of the luminosity of each of the lamps.

This invention relates in general to portable electric testing devices and more particularly to a pocket size meterless device having a pair of test conductors for testing of continuity of circuits, predetermined ranges of electrical resistance and circuit voltages, and operative also as a flashlight.

Prior electric testing devices of this general character are dependent upon relatively expensive construction, including electric measurement meters for indicating exact electrical measurements and are relatively large and bulky for handling in close quarters and subject to failure from mishandling or shock.

The present invention overcomes the above objections and disadvantages by the provision of a relatively simple rugged battery energized tester of relatively small size for convenient handling and provides for testing circuit continuity by the degree illumination variation of a filament type lamp and also for testing the resistance of a circuit above or below a predetermined value, which are the principal objects of the invention.

A further object of the invention is the provision of a glow type lamp for indicating A.C. or D.C. voltage of each of three predetermined ranges.

Another object of the invention is the provision of a filament lamp energized by internal batteries and an externally operated switch for energizing a filament type lamp for testing the batteries and providing illumination.

These and other objects and advantages in one embodiment of the invention are described and shown in the following specification and drawing, in which:

FIG. 1 is a front face view of the tester.

FIG. 2 is a plan view of the tester shown in FIG. 1 with cover removed showing the elements secured to the front side of a panel in the casing.

FIG. 3 is a lower end elevation of the tester shown in FIG. 1.

FIG. 4 shows the printed circuit on the under side of the panel shown in FIG. 2.

FIG. 5 is a cross sectional side view taken through section line 5—5, FIG. 1.

FIG. 6 is a schematic circuit diagram of the printed circuit shown in FIG. 4 for connecting the elements shown in FIG. 2.

FIGS. 1, 2, 3 and 5 show a casing having a cover portion 1 and a mating base portion 2 for retaining the electric elements of the tester, to be hereinafter described.

Referring to FIG. 1, a transparent bullseye 3 is secured in the upper end of the casing for transmitting light from a lamp in the casing adjacent thereto and finger operators 4 and 5 are adapted to operate switches in the casing to be hereinafter described.

The cover portion 1 also has transparent bullseyes 6 and 7 in spaced relation therein for conducting light from filament lamps adjacent thereto inside the casing and a rectangular window 8 in the cover member is for the observation of selective ranges of illumination from a glow lamp within the casing.

FIG. 3 shows the test cord conductor sockets or jacks 9, 10 and 11, which are secured in the base portion 2, for selectively receiving the test cord plugs 27 and 28, shown in FIG. 1, which enter corresponding holes through the base portion 2.

Referring to FIG. 4, a circuit panel 12, of uniform thickness made of dielectric material, such as fiber reinforced phenol formaldehyde plastic, contains a so-called "printed circuit" of flat copper conductors retained on the surface of the rear side thereof and connected to all of the electric components of the device on the front surface of the panel.

The circuit panel is secured within the base portion 2 by screws 13—13 and elongated hex nuts 14—14, which also serve to hold the cover and the rear portions 1 and 2 together, as shown in FIG. 5.

FIG. 2 shows the placement of all of the electric elements on panel 12, which are retained thereon by the connection of their terminals, through the printed circuit shown in FIG. 4, by well known solder means.

In this particular embodiment, two one and a half volt dry batteries 15 and 15a, such as Eveready #E91–AA, are parallel mounted in opposite polarity position between the two pairs of battery retention clips 16, which clips are connected to proper portions of the printed circuit.

The S.P.D.T. switch 17 is operated by finger operator 4 extending through the casing and the terminals thereof are connected to the printed circuit. The normally open S.P.S.T. switch 18, also connected to a portion of the printed circuit and the finger operator 5 thereof, also extends through an aperture in the casing.

In this embodiment, two filament type lamps 19 and 22, of the integral lens type, such as General Electric #222—2.2 volt—.25 amp—TL 3 bulb, are removably retained in sockets 20 and 23, respectively, and positioned adjacent corresponding bullseyes 3 "LO" and 7 "HI." The terminals of the sockets 20 are connected through the panel to the printed circuit.

A filament lamp 21, also of the integral lens type, such as General Electric type 112—1.2 volt—.22 amp—TL 3 bulb, is retained in socket, not shown, adjacent bullseye 6. The terminal of lamp 21 is connected to the printed circuit shown in FIG. 4.

A two electrode glow lamp 24, such as a neon General Electric type NE–2, is secured to the upper side of said panel by a clip 25 and is positioned adjacent the transparent window 8 in the cover portion 1 of the casing, shown in FIG. 1. One terminal of the glow lamp is connected to jack 10 secured to the panel with the entry thereof adjacent an aperture through the casing. The remaining terminal of the glow lamp is connected to one terminal of a resistor of predetermined resistance and the remaining terminal thereof connected to the printed circuit, thus completing the assembly of the tester. The specific value of the resistor 26 is in the order of 300,000 ohms, however the specific resistance is dependent upon the glow lamp characteristics and the desired ranges of voltages to be tested, such as hereinafter described.

The jacks 9 and 11 are secured to the panel 12, connected to the printed circuit, with each entry thereof adjacent an aperture in the base 1 to receive the plugs 27 and 28 of the flexible test conductors 29 and 30, of predetermined length, which conductors terminate in a prod 31, and an alligator type clip 32, respectively.

Referring to the schematic diagram, FIG. 6 of the printed circuit shown in FIG. 4, the jack 9 is connected to pole 34 of switch 17 by a conductor 32. A branch conductor 33 of conductor 32 is connected to one terminal of resistor 26 and the negative terminal of battery 15. The contact 35 of switch 17 is connected to one terminal of lamp 19 by conductor 36. The remaining terminal of lamp 19 is connected to one terminal of lamp 22 and the positive terminal of battery 15a. The remaining terminal of lamp 22 is connected to contact 42 of switch 18. Jack 11 is connected to the pole 38 of switch 18 by conductor 39. Contact 40 of switch 18 is connected to one terminal of lamp 21 by conductor 43. The remaining terminal of lamp 21 is connected to the positive terminal of battery 15 and the negative terminal of battery 15a by conductor 44. One electrode 45 of glow lamp 24 is connected to jack 10 by conductor 46. The remaining electrode 47 of lamp 24 is connected to the remaining terminal of resistor 26 by conductor 48.

In operation and before making circuit tests, a test of the batteries in the device should first be made by closing switch 17 with finger operator 5, which will energize lamp 19 through a portion of the printed circuit, which series connects batteries 15 and 15a which will energize the lamp with the sum of the voltage of both batteries. If the lamp produces a white light, the batteries are operating at full or near full voltage. It is apparent that the operation of this circuit also provides for the tester to be used as a flashlight.

A circuit to be tested, presumed to be of low resistance, is first tested by connecting test cords 29 and 30 thereto which are connected to jacks 9 and 11 of the tester and the switch operator 4 of switch 18 is moved from its central "OFF" position to its "LO" position, corresponding to the pole 38 of the switch moved into contact with switch contact 40. Then a circuit will be completed through a portion of the printed circuit through lamp 21 which will be visible in varying degrees through bullseye 6 which will indicate continuity of the circuit if the value thereof is close to six ohms or less. It will be noted that in the event the circuit tested is close to six ohms, the filament of the lamp will be deep red in color, and close to the threshold of visibility when under close scrutiny through bullseye 6 and any lower resistance of a circuit under test will produce proportionate increases in the brilliancy of the lamp to a bright white color at a resistance near zero.

A higher resistance test is made by moving operator 4 to its "HI" position. Then the pole of switch 18 will connect switch contact 42 and connect a portion of the printed circuit through lamp 22 and the now series connected batteries 15 and 15a. Under these conditions, the lamp 22 will produce a deep red critical color close to the threshold of visibility when the resistance of the circuit under test is close to thirty-five ohms. Again the brilliancy of the lamp will be proportional to resistance under thirty five ohms to full brilliancy when the resistance is close to zero.

In order to test commercial A.C. voltage from 100 to 600 volts, the test cords 29 and 30 are plugged into jacks 9 and 11 which will connect resistor 26 to a portion of the printed circuit and through glow lamp 24. When the test cords are connected to an alternating current circuit of between 100 and 175 volts, both electrodes 45 and 47 will illuminate at low intensity. When the cords are applied across a circuit of 175 to 235 volts, the elements of the glow lamp will light with medium intensity. When the cords are connected across a source of voltage from 275 to 600 volts, the electrodes 45 and 47 will illuminate at high intensity. Thus the user, with a little practice, will be able to determine each of the three voltages commonly in general use.

Direct current voltages up to a maximum of 275 volts may be tested in the same manner as the A.C. voltages and the polarity of the circuit tested obtained by noting the predetermined polarity of the test cords which may be readily determined, since only the cathode or negative one of the electrodes will illuminate when a D.C. voltage is applied to the test cords.

This invention also comprehends the use of a wide range of lamps of different characteristics described, as well as the use of batteries of different potential for a variety of circuits of a large range of characteristics.

Having described my invention, I claim:

1. A portable electric tester for hand use comprising a casing having a base portion and a demountable cover portion,
   a panel member secured within said base portion including a printed circuit means on the under side thereof for providing all of the circuit conductors for said tester,
   a first and second battery retained on the upper side of said panel member with the pair of terminals of each connected in said circuit means,
   a normally open S.P.D.T. switch means secured on the said upper side of said panel with the three terminals thereof connected in said circuit means and with the finger operator therefor extending through an aperture in said casing,
   a first filament type lamp secured to said panel member with the two terminals thereof connected in said circuit to be energized by one of said batteries,
   a second filament type lamp secured to said panel member with the two terminals thereof connected in said circuit to be energized by the said first and second battery series connected,
   a transparent bullseye means through said casing adjacent each said lamp,
   a first and second test jack secured on the upper side of said panel connected to said circuit means with the entry of each said jack positioned adjacent a corresponding clearance aperture in said casing,
   a pair of flexible test conductors with one end of each terminating in a plug inserted in each said jack and the opposite end of each said test conductor terminating in a circuit under test whereby a circuit under test within a predetermined range of low resistance connected to said test conductors and the movement of said switch to a first position by said finger operator will energize said first lamp to a predetermined degree of brilliancy by one of said batteries with the said brilliancy corresponding with the resistance of said circuit under test and whereby a circuit under test of a predetermined higher resistance range connected to said test conductors and the movement of said switch by said finger operator to said second position will energize said second lamp from the series connected said first and second battery to a predetermined brilliancy corresponding to a range of resistance of said second circuit under test.

References Cited

UNITED STATES PATENTS

| | | | |
|---|---|---|---|
| 1,918,834 | 7/1933 | Crago | 324—72.5X |
| 2,511,918 | 6/1950 | Huff | 324—51 |
| 2,553,986 | 5/1951 | Statham | 324—62 |
| 2,794,167 | 5/1957 | Jones, Jr. | 324—53 |
| 2,933,680 | 4/1960 | Adams | 324—53X |
| 2,945,180 | 7/1960 | Parker | 324—115X |
| 2,962,703 | 11/1960 | Summerer | 340—252X |
| 3,214,689 | 10/1965 | Outen | 324—51 |
| 3,416,074 | 12/1968 | Schoonover | 324—133X |

OTHER REFERENCES

Continuity Checker, Radio Electronics, November 1954, p. 125.

GERARD R. STRECKER, Primary Examiner

U.S. Cl. X.R.

324—62